United States Patent [19]

Loughran

[11] Patent Number: 4,971,612
[45] Date of Patent: Nov. 20, 1990

[54] RECLASSIFYING SILENCER

[75] Inventor: James F. Loughran, Hanover Park, Ill.

[73] Assignee: Arrow Pneumatics, Inc., Lake Zurich, Ill.

[21] Appl. No.: 327,521

[22] Filed: Mar. 23, 1989

[51] Int. Cl.⁵ .......................................... B01D 27/04
[52] U.S. Cl. ...................................... 55/276; 55/320; 55/487; 55/523; 55/DIG. 21; 181/258
[58] Field of Search ................. 55/276, 320, 332, 333, 55/379, 483, 487, 523, 527, 528, DIG. 21; 181/252, 256, 258

[56] References Cited

U.S. PATENT DOCUMENTS

| | | | |
|---|---|---|---|
| 2,720,278 | 10/1955 | Wiley | 55/523 X |
| 3,009,531 | 11/1961 | Mead | 181/256 X |
| 3,147,097 | 9/1964 | Aguas | 55/276 |
| 3,540,190 | 11/1970 | Brink | 55/523 X |
| 3,884,659 | 5/1975 | Ray | 55/379 |
| 3,949,828 | 4/1976 | Frichaux | 181/256 X |
| 4,134,472 | 1/1979 | Trainor | 181/258 |
| 4,149,862 | 4/1979 | Sewell | 181/258 X |
| 4,316,523 | 2/1982 | Boretti | 181/258 X |
| 4,749,058 | 6/1988 | Trainor | 181/258 X |

Primary Examiner—Charles Hart
Attorney, Agent, or Firm—Richard Bushnell

[57] ABSTRACT

There is disclosed a silencer for a pneumatic system, including a sound muffler containing a primary filter and removable cartridge containing an oil mist reclassifying filter.

13 Claims, 3 Drawing Sheets

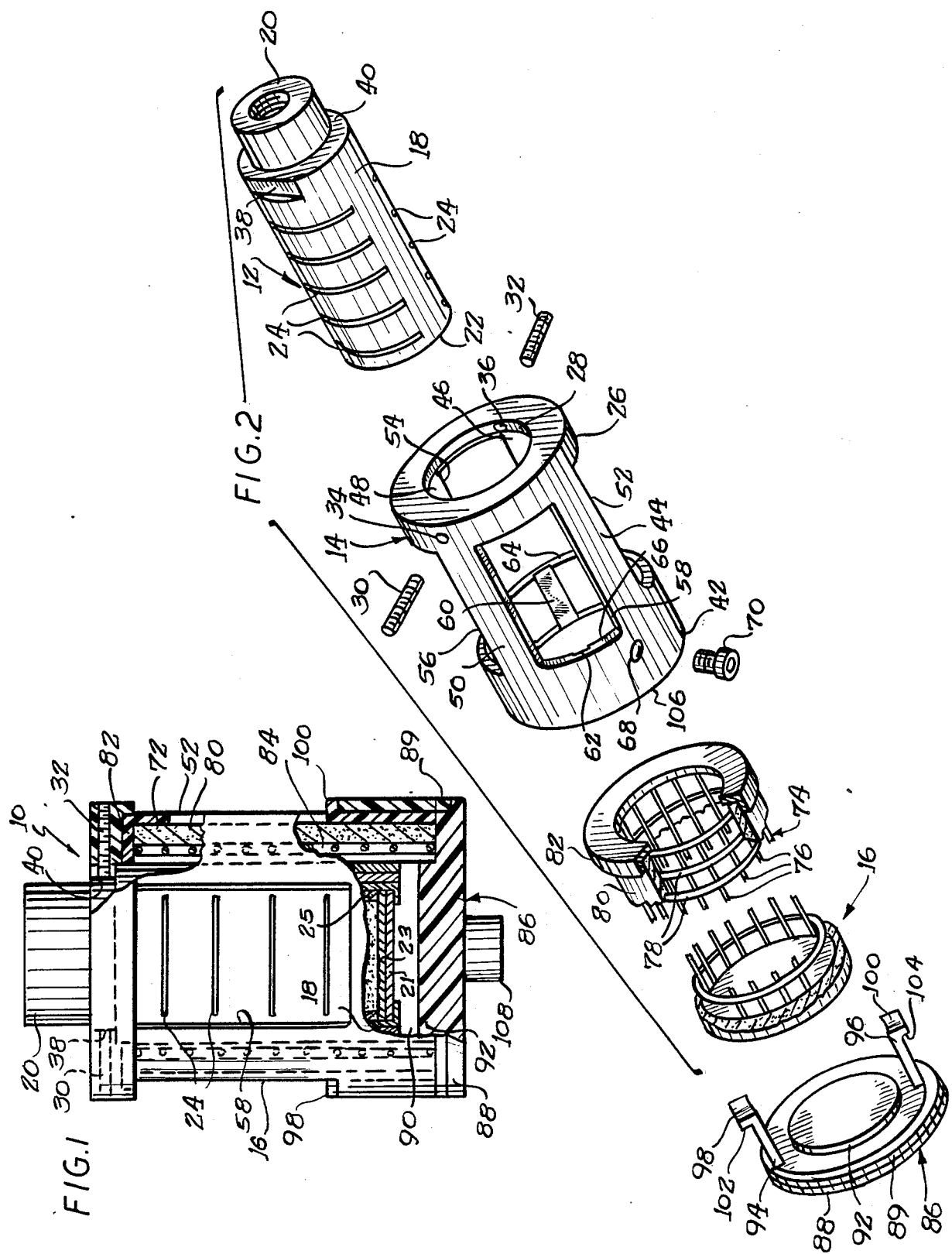

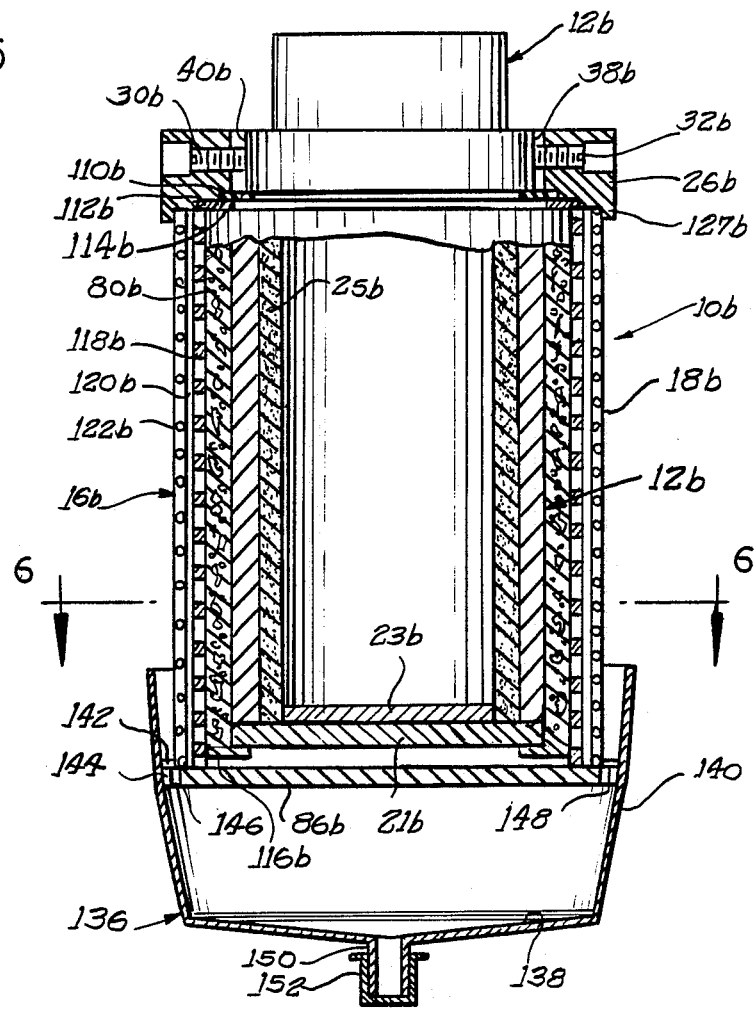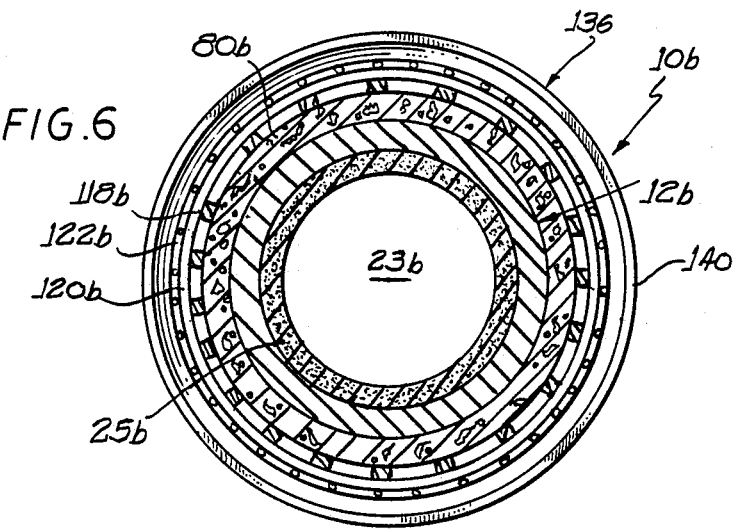

RECLASSIFYING SILENCER

BACKGROUND OF THE INVENTION

The present invention relates to a novel silencer or muffler, and more particularly to a novel silencer/reclassifier for compressed air exhausts for pneumatic systems of the type which, for example, include air motors, air cylinders and the like.

As will be understood, compressed air systems of the type contemplated herein are frequently capable of producing excessive exhaust noises. In addition, it is common practice to introduce a lubricating oil mist into the air line so that the system exhaust may include excessive levels of oil aerosols. Heretofore, it has been common practice to provide a silencer or muffler connected in the exhaust line of a pneumatic system for reducing exhaust noises. It has also been suggested that such silencers be incorporated in filter structures capable of effectively reducing or eliminating undesirable levels of oil aerosols passed into the atmosphere with the compressed air. However, the structures of such heretofore suggested combined silencers and oil mist filters have been such that the filter tends to clog up relatively quickly and the expense involved in installing and maintaining systems utilizing such devices has been unnecessarily high.

SUMMARY OF THE INVENTION

It is an important object of the present invention to provide a novel oil reclassifying or coalescing silencer which may be installed and maintained in a pneumatic system easily and economically.

A more specific object of the present invention is to provide a novel reclassifying or coalescing silencer for pneumatic systems which includes a silencer or muffler member and a filter element or cartridge constructed so that the filter element or cartridge may be readily removed and replaced for maintenance purposes without the need for discarding the silencer member or even disconnecting the silencer member from the pneumatic system.

A further object of the present invention is to provide a novel reclassifying or coalescing silencer having a combination of filter means constructed and arranged for reducing the frequency of clogging to a degree which requires removal and replacement of a reclassifying filter component.

Still another object of the present invention is to provide a novel reclassifying or coalescing silencer structure of the above-described type which may be economically produced utilizing heretofore available muffler or silencer components.

More specifically, it is an object of the present invention to provide a novel oil coalescing or reclassifying silencer module comprising a pneumatic silencer member incorporating primary filter means for removing dirt and the like from an exhaust air stream connectable to an exhaust line, and a filter secondary element or assembly easily and removably assembled with the silencer member for trapping and coalescing oil aerosols carried by the exhaust air.

Other objects and advantages of the present invention will become apparent from the following detailed description.

BRIEF DESCRIPTION OF THE DRAWINGS

FIG. 1 is an elevational view, partially broken away, showing an oil reclassifying or coalescing silencer module incorporating features of the present invention;

FIG. 2 is an exploded perspective view showing the various elements of the oil coalescing silencer module of FIG. 1;

FIG. 5 is a partial sectional view showing another modified form of the present invention; and FIG. 6 is a sectional view taken along line 6—6 in FIG. 5.

DETAILED DESCRIPTION OF AN ILLUSTRATIVE EMBODIMENT

Figure 3:
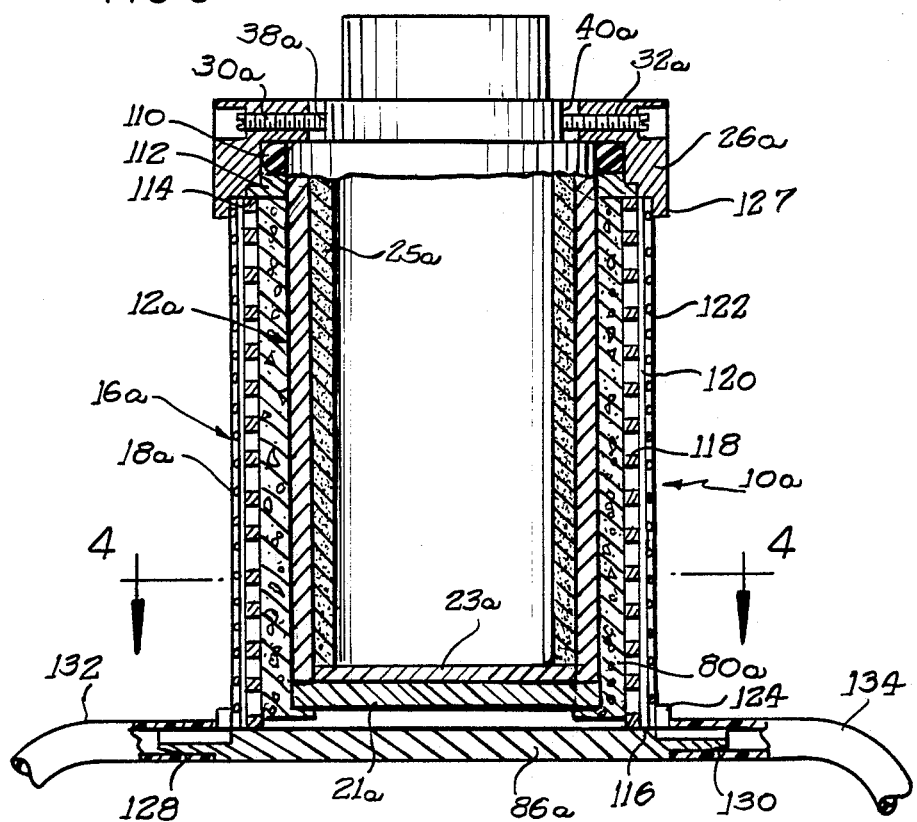
FIG. 3 is a partial sectional view showing a modified form of the present invention.

Referring now to the drawings wherein like parts are designated by the same numerals throughout the figures, an oil coalescing silencer module 10 is shown in a fully assembled condition in FIG. 1. The module 10 comprises a pneumatic silencer member 12 connectable with an exhaust line of a pneumatic system. A rugged metal protective body member 14 encloses the silencer or muffler member 12 and a filter element or cartridge 16 is adapted to be removably positioned between the muffler member 12 and the cage or housing 14 in the manner described below.

It is contemplated that the pneumatic silencer member 12 may be of a general type which is presently commercially available. The silencer member 12 comprises a hollow tubular metal body 18, preferably of steel, having either a male or female fitting 20 at one end which may be threadedly or otherwise coupled with an exhaust line of a pneumatic system, not shown. An opposite end 22 of the tubular body is closed by end plate 21. A shock absorbing disc 23 of suitable known material is positioned over the end plate 21. Numerous openings such as arcuate slits 24 are formed in the peripheral wall of the body 18. The slits 24 are narrow and are designed to attenuate and reduce exhaust noises in a known manner. At the same time the opening or slits which may take various forms, have a width or transverse dimensions sufficiently large to minimize any possibility of clogging by oil, dirt or the like in the air line.

The muffler 12 also includes a primary filter 25 in the form of a tubular body of porous sintered metal such as bronze having a pore size of about 40 microns. The filter 25 is positioned within the steel body 18 so as to cover the exhaust parts or slits 24. The pore size of the filter 25 is sufficiently small to trap larger dirt and similar particles which may be entrained in the air stream while permitting fine oil aerosols to pass on through.

The cage or housing member 14 has a first annular end portion or head 26 with a hole 28 therethrough. The diameter of the hole 28 is slightly larger than the external diameter of the silencer or muffler body 18 which may be inserted therethrough. The silencer or muffler member 12 is adapted to be secured in position within the housing or body 14 by a pair of set screws 30 and 32 threaded through radially extending apertures 34 and 36 in the annular end portion 26 of the body 14. Preferably, the silencer or muffler body 18 is formed with flat surfaces 38 and 40 against which the set screws 30 and 32 may be tightened.

The housing or body 14 has a lower annular end portion 42 spaced axially from the end portion 26 and connected thereto by longitudinally extending sections 44, 46, 48 and 50 which define therebetween laterally opening windows 52, 54, 56 and 58 for permitting the escape of the exhaust air. Axially extending grooves 60 and 62 are formed in diametrically opposite inner walls of the end portion 42 and respectively intersect lower edges 64 and 66 of the windows 54 and 58 for a purpose to be described below. A lateral drain hole 68 connected with a fitting 70 is provided adjacent the lower margin of the end portion 42 for permitting reclassified or coalesced oil to be drained from the module.

As shown best in FIG. 1, the silencer member 12 and the body or housing member 14 are proportioned so as to define a tubular space 72 therebetween which is adapted to receive the filter assembly or cartridge 16. The cartridge comprises a reinforcing core or grid 74 including a plurality of axially extending ribs 76 which are encircled by and bonded to a plurality of axially spaced hoops or rings 78. Preferably, the reinforcing core is made from a suitable plastic material such as polypropylene. A tubular element 80 of an oil coalescing filter media surrounds and is supported by the reinforcing core 74.

The filter element 80 is formed from a porous material capable of trapping and coalescing oil aerosols carried by exhausting compressed air passing from the muffler or silencer member. Preferably, the filter media of the element 80 is a glass filled borasilicate and has a pore size of about 0.03 micron. It is noted that relatively fine pores through the filter media are of much smaller dimensions than the pores in the filter 25 of the muffler. Thus, the filter 80 is effective for coalescing the oil mist, but is subject to being plugged up sufficiently to require replacement. However, in accordance with one feature of the present invention the primary filter 25 in the muffler body removes larger dirt and particles which could cause premature plugging of the reclassifying filter. Since the pore size in the filter 25 is relatively larger and may be, for example, about 40 microns, the filter 25 is not easily clogged. In the event such clogging does occur, the structure of the muffler is such that it can be cleaned. The filtering media of element 80 also acts as a secondary silencer for achieving further attenuation of noise generated by the air exhaust.

The upper end of the filter cartridge is closed by an end seal 82 preferably formed from a plastic material such as urethane. The annular end seal 82 is adapted to abut against the undersurface of the end portion 26 of the body 14 and to engage and center the filter element between the peripheral wall of the muffler body 18 and the outer wall of the cage or housing 14.

It will be noted that the inner diameter of the annular end seal 82 is similar to but slightly greater than the outer diameter of the tubular body 18 of the silencer or muffler while the outer diameter of the annular seal 82 is similar to but slightly less than the inner diameter of the peripheral wall portions of the housing or cage 14. Furthermore, the spaced ribs and hoops 76 and 78 of the reinforcing core effectively provide an open annular space 84 between the silencer body 18 and the filter element 80 so as to promote free flow of air from the various muffler outlet slits 24 throughout the length of the filter element 80 for minimizing back pressure and possible clogging problems.

The lower end of the filter cartridge is defined by an end cap 86 comprising a disc portion 88 having a diameter similar to the diameter of the body or cage member 14. A resilient O-ring or gasket 89 is positioned between the end cap disc 88 and a lower edge of the cage or housing member 14 for providing an effective seal. Thus, the lower end portion 42 of the housing or body 14 provides an effective sump for collecting oil draining from the filter element 80. As indicated above, a drain aperture 68 communicating with a fitting 70 provides for draining excess oil from the sump 90.

As shown in the drawings, the disc poriton 88 of the end cap is formed with a raised central boss 92 which projects into and radially supports the lower end of the grid-like reinforcing core 74. Preferably, the disc portion of the cap member is adhesively or otherwise affixed or bonded to the reinforcing core 74 and the filter element 80 so as to provide a unitary assembly.

The filter cartridge is adapted to be quickly and easily removably assembled with the muffler element 12 and body 14 without the aid of any tools. As previously indicated, the elements of the cartridge comprising the reinforcing core 74, the filter media 80, the end seal 82 and the end cap 86 are constructed so that they may be readily slipped within the body 14 and over the muffler or silencer member 12. In addition, it is to be noted that the end cap 86 which is preferably molded from a suitable plastic material, is provided with diametrically opposite axially extending finger elements 94 and 96 which respectively include laterally outwardly projecting hook or latch portions 98 and 100 at their upper ends. The hook or latch portions 98 and 100 respectively present downwardly facing and preferably slightly inclined cam surfaces 102 and 104 which are spaced from the disc portion 88 of the cap 86 a distance similar to the axial spacing between a lower edge 106 of the body or housing 14 and the previously mentioned upwardly facing edges 64 and 66 which are intersected by the grooves 60 and 62. The arrangement is such that during assembly of the filter cartridge in the housing or body 14, the laterally projecting hook or latch portions 98 and 100 of the fingers 94 and 96 will first be aligned with the grooves 60 and 62 so as to avoid material interference with the housing 14. When the cartridge has been fully inserted within the housing, it is merely necessary to turn the end cap 88 so as to cause the cam surfaces 102 and 104 to engage the surfaces 64 and 66 to thereby retain the cartridge in its assembled position. By providing the surfaces 102 and 104 with an inclination relative to the longitudinal axis of the module, the turning action will cause the cap to be tightened with respect to the body 14 and thus the gasket 89 to be compressed for insuring a tight seal. Alternatively, the inclination to the cam surfaces 102 and 104 could be omitted with the surfaces being located so as to require sufficient axial pressure to be applied against the end cap to obtain the desired sealing action before turning the cap to engage the surfaces 102 and 104 over the edge surfaces 64 and 66.

In order to facilitate turning of the cap member 86 without the aid of tools, the cap is preferably provided with a central thumb screw type depending flange 108 as shown in FIG. 1. As will be understood, this flange may be easily grasped by a workman for turning the end cap to either assemble or disassemble the filter cartridge with respect to the housing or body 14.

Figure 4:
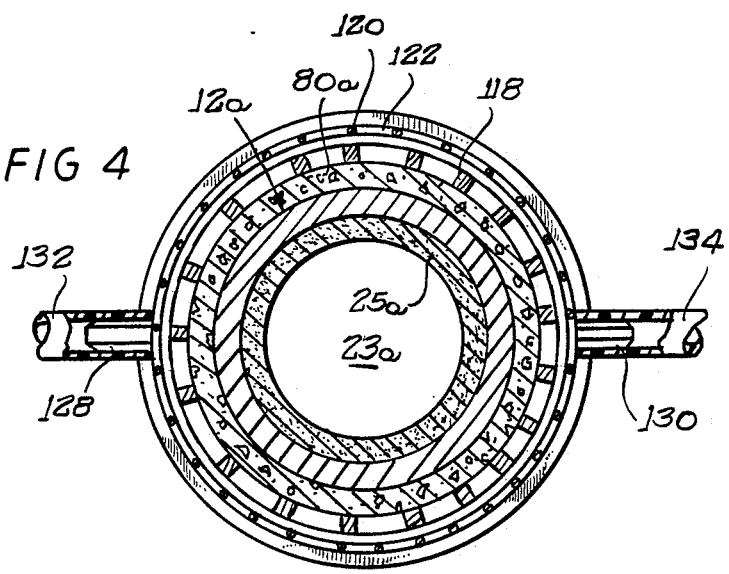
FIG. 4 is a sectional view taken along line 4—4 in FIG. 3.

In FIGS. 3 and 4 there is shown a modified form of the present invention in which elements corresponding to those described above are designated by the same reference numerals with the suffix "a" added. This embodiment differs primarily in that the side portions of the previously described cage 14 have been omitted since such a structure is suitable for many applications.

In this embodiment, the annular end or head member 26a has, as before, an internal diameter sufficient to receive therethrough the body of the primary filter and muffler unit 12a. The muffler is releasably fixed with respect to the annular head 26a by set screws 30a and 32a engagable with flats 38a and 40a on opposite sides of the muffler. On O-ring 110 is provided for effecting a seal between the annular hand or head 26a and the muffler body, which O-ring is fixed in position by a retainer ring 112.

The cartridge 16a has its upper end adhesively or otherwise bonded as at 114 to the end member 26a. An opposite end of the cartridge is closed by end cap 86a which is also adhesively or otherwise bonded to the cartridge as at 116.

The cartridge 16a is formed so as to be self supporting. More specifically, the cartridge 16a comprises an inner tubular element 80a formed from a coalescing filter material such, for example, as the aforementioned glass filled borasilicate. The filter element is surrounded by a relatively rigid self-supporting expanded or perforated tube 118 preferably formed from a suitable plastic material such as polyethylene. The tube 118 is in turn, surrounded by a tubular layer 120 which assures that any mist passing through the filter 80a and the perforated tube 118 will be captured and will drain to the bottom of the cartridge. Finally, the drain layer 120 which may, for example be formed from a suitable polyester fabric is surrounded and supported by a tube 122 of a netting or large mesh fabric preferably formed from a suitable material such as polypropylene or polyester.

In the embodiment shown, the bottom end cap 86a has an annular flange 124 for receiving and retaining a lower end of the cartridge 16a similar to an annular flange 127 on the upper end of head member 26a which receives and retains the upper end of the cartridge. One or more drain openings or spouts are provided on the end cap 86a. The unit includes a pair of spouts 128 and 130 circumferentially spaced from each other on the end cap and preferably located at diametrically opposite positions for more effectively draining reclassified or coalesced oil from the cartridge. Drain lines or tubes 132 and 134 are assembled over the spouts 128 and 130 for directing the coalesced oil to a suitable point of discharge, not shown.

Referring now to FIGS. 5 and 6, there is shown another embodiment of the present invention in which elements corresponding to those described above are designated by the same reference numerals with the suffix "b" added. This embodiment incorporates further simplifications in the structure along with means for optionally collecting and retaining reclassified oil drained from the cartridge.

Economies in production are obtained by fabricating most of the parts from a suitable plastic material such as nylon or polypropylene. For example, the sets screws 30b and 32b are preferably formed from nylon and the gasket retainer 112b and end cap 86b are preferably formed from polypropylene. As before, the coalescing core 80b is fabricated from the porous borasilicate and is supported and wrapped with a polyester fabric. It is understood, that in this embodiment, like those described above, the muffler unit 12b includes a porous sintered metal element corresponding to the above described element 25 which performs a primary filtering function while the borasilicate 80 serves a secondary filter along with providing the coalescing or reclassifying function.

The embodiment of FIGS. 5 and 6 also incorporate a cup or sump element 136 which serves to collect oil which drains from the filter cartridge. The cup comprises a bottom wall 138 and a sidewall 140 which is adapted to extend upwardly around and overlap a lower end portion of the filtered cartridge. An internal rib 142 projects inwardly from the sidewall 140 and is adapted to snap over a peripheral portion 144 of the end member 86b for retaining the parts in assembled relationship. As shown in FIG. 5, drain holes 146 are provided at annularly spaced locations through the peripheral margin 144 of the end cap 86b for enabling oil to drain from the cartridge into the bottom of the cap. The cup of sump member 136 is economically formed from a suitable resilient plastic material such as polypropylene which is adapted to yield sufficiently to permit the rib 142 to snap over the peripheral marginal or flange portion 144 of the cap member 86b to permit assembly and disassembly of the part.

The cup member 136 has a drain spout 150 integrally formed with the bottom 138 thereof. This spout is adapted to be closed by a cap or plug 152 so that the coalesced oil may be collected for intermittent dumping. Alternatively, the spout 150 may be connected to a drain tube, not shown, for directing the coalesced oil to any suitable point of discharge.

From the above description, it is seen that an oil coalescing silencer has been provided which if capable of effectively and efficiently performing the dual functions of silencing and entrapment of oil aerosols. Furthermore, with the novel structure disclosed herein, it is apparent that in the event the filter element becomes clogged, the filter cartridge may be easily and quickly removed and replaced without the necessity of discarding the entire module as is the case with heretofore suggested coalescing silencers.

While a preferred embodiment of the present invention has been shown and described herein, it is obvious that many structural details may be changed without departing from the spirit and scope of the appended claims.

The invention is claimed as follows:

1. A reclassifying silencer module for systems utilizing oil laden compressed air comprising a silencer body including connector means connectable with an exhaust line of said system and also including sound attenuating discharge openings spaced thereon, primary filter means having a first pore size assembled with said silencer body, a reclassifying filter cartridge including a filter material having a second pore size substantially smaller than said first pore size encircling said silencer body, said primary filter means and said openings without interfering with said connector means, and means releasably securing said filter cartridge with respect to the silencer body for enabling the filter cartridge to be removed independently of said silencer body and said primary filter means and replaced without disconnecting the silencer body from said system.

2. A reclassifying silencer module as defined in claim 1, which includes means defining a sump at a lower end of said filter cartridge for receiving coalesced oil removed from exhaust air.

3. A reclassifying silencer module as defined in claim 1, which includes a housing member surrounding said silencer body and said cartridge and secured with respect to said silencer body, said cartridge including an annular seal member within said housing and closing an upper end of said cylindrical body of reclassifying material, said housing comprising a portion defining a sump for reclassified oil adjacent a lower end of the cartridge, and said cartridge including an end cap closing a lower end of said sump and a lower end of said cylindrical body of reclassified material.

4. A reclassifying silencer module, as defined in claim 1, wherein said means releasably securing said cartridge with respect to the silencer body comprises an annular head, said cartridge being operatively supported with said head, said silencer body extending through said head, and means extending between said silencer body and said head for detachably securing said body and said head together.

5. A reclassifying silencer module, as defined in claim 4, which includes a bottom end cap for closing an end of said cartridge opposite from said head and collecting oil adjacent a bottom end of said cartridge, and drain opening means for draining such collected oil.

6. A reclassifying silencer module, as defined in claim 5, which includes cage means connected with said annular head and surrounding said cartridge, said bottom end cap being removably connected to said cage means.

7. A reclassifying silencer module, as defined in claim 5, wherein said cartridge is self supporting and has an upper end secured to said annular head and a lower end secured to said bottom end cap.

8. A reclassifying silencer module, as defined in claim 7, wherein said cartridge comprises a relatively rigid self supporting perforated tubular member surrounding said silencer body, and a tubular layer of reclassifying filter material supported by said perforated tubular member.

9. A reclassifying silencer module, as defined in claim 8, wherein said layer of reclassifying filter material is disposed between said perforated tubular member and said silencer body, said cartridge further including a fabric layer surrounding said perforated body for promoting draining of coalesced oil to said bottom end cap.

10. A reclassifying silencer module, as defined in claim 8, wherein said cartridge further includes a tubular member of open mesh material surrounding and retaining said fabric layer.

11. A reclassifying silencer module comprising a silencer body connectable to an exhaust line of a pneumatic system and having a plurality of exhaust ports, a primary filter element of porous sintered material within said body and covering said ports, and a reclassifying filter cartridge detachably connected to and surrounding said silencer body, said primary filter element having pores of a first size for filtering relatively large particles from exhaust air while passing oil mist entrained in said air, and said reclassifying filter having pores of a second relatively small size for trapping and reclassifying said oil mist.

12. A reclassifying silencer module, as defined in claim 11, which includes a sump member releasably connectable with said cartridge for collecting reclassified oil.

13. A reclassifying silencer module, as defined in claim 11, wherein said reclassifying filter cartridge comprises an annular body for removably receiving said silencer body therethrough, means extending between said bodies for releasably connecting said bodies, said cartridge further including a cylinder of porous material having one end fixed to said annular body, and an end cap closing an opposite end of said cylinder.

* * * * *